United States Patent
Xu

(10) Patent No.: US 11,733,099 B2
(45) Date of Patent: Aug. 22, 2023

(54) SYSTEM AND METHOD TO CALIBRATE COLOR MEASUREMENT DEVICES

(71) Applicant: DATACOLOR INC., Lawrenceville, NJ (US)

(72) Inventor: Zhiling Xu, Princeton Junction, NJ (US)

(73) Assignee: DATACOLOR INC., Lawrenceville, NJ (US)

( * ) Notice: Subject to any disclaimer, the term of this patent is extended or adjusted under 35 U.S.C. 154(b) by 892 days.

(21) Appl. No.: 16/668,879

(22) Filed: Oct. 30, 2019

(65) Prior Publication Data

US 2021/0131874 A1     May 6, 2021

(51) Int. Cl.
| | |
|---|---|
| G01J 3/52 | (2006.01) |
| G06N 3/08 | (2023.01) |
| G01J 3/00 | (2006.01) |
| G01J 3/46 | (2006.01) |
| G01J 3/50 | (2006.01) |
| G06N 20/00 | (2019.01) |

(52) U.S. Cl.
CPC .......... G01J 3/524 (2013.01); G01J 3/00 (2013.01); G01J 3/46 (2013.01); G01J 3/463 (2013.01); G06N 3/08 (2013.01); *G01J 3/462* (2013.01); *G01J 3/501* (2013.01); *G06N 20/00* (2019.01)

(58) Field of Classification Search
CPC .... G01J 3/462; G01J 3/524; G01J 3/00; G01J 3/46; G01J 3/463; G01J 3/501; G06N 3/08; G06N 20/00

USPC .......................................................... 356/326
See application file for complete search history.

(56) References Cited

U.S. PATENT DOCUMENTS

| | | | |
|---|---|---|---|
| 9,200,963 B2 | 12/2015 | Xu et al. | |
| 10,156,477 B2 | 12/2018 | Yu et al. | |
| 2017/0272619 A1* | 9/2017 | Finlayson | ............ H04N 1/6058 |
| 2021/0058596 A1* | 2/2021 | Afifi | ......................... G06T 7/90 |

FOREIGN PATENT DOCUMENTS

WO    WO-2020156653 A1 *   8/2020  ........... H04N 1/6063

OTHER PUBLICATIONS

U.S. Appl. No. 16/144,280, filed Sep. 27, 2018, Taeyoung Park, et al.

* cited by examiner

*Primary Examiner* — Sunghee Y Gray
(74) *Attorney, Agent, or Firm* — Leason Ellis LLP

(57) ABSTRACT

A system including a processor and a memory configured to store code executed by the processor is provided. In one or more implementations, the processor is configured by the code to calibrate measurements made by color measurement devices. In one particular implementation, the processor receives a measurement dataset of one or more color values, for a sample obtained by a color measurement device. The processor is configured to convert the measurement dataset to a standard space measurement dataset using a standard space measurement model and calculate a color dataset based on the standard space measurement dataset using a color conversion model. The processor is further configured to output the calculated color dataset to at least one of a display, database or local memory store.

11 Claims, 7 Drawing Sheets

SYSTEM AND METHOD TO CALIBRATE COLOR MEASUREMENT DEVICES

FIELD OF INVENTION

The present application is directed to systems and methods for calibrating color measurement devices using a multi-step calibration process.

BACKGROUND

Often a color measurement device must be calibrated prior to use. For example, when a color measurement device is part of a production or manufacturing process, the fidelity of different color measurement devices to a calibrated standard is paramount. Such calibration processes are often complex and time consuming. Various approaches in the field of color measurement have been used to reduce the complexity of color device calibration.

For example, U.S. Pat. No. 10,156,477 granted to George Yang Yu, et. al., (herein incorporated by reference as if presented in its entirety) teaches a method of grouping similar color sensing devices together and aligning each group to a reference device. Yu teaches that, for the alignment of each group, a large quantity of training color samples are needed. For instance, an artificial neural network (ANN) or other machine learning methods can be used to align the devices with the reference, but the training set of data is large. For instance, a color set of 7383 samples were used. For mass production of color measurement devices, this level of calibration training is impractical.

Likewise, applicant Datacolor's own patent application titled "Inter-Instrument Variation Correction" and afforded U.S. patent application Ser. No. 16/144,280, (herein incorporated by reference as if presented in its entirety) describes a method to improve inter-instrument agreement of different color measurement devices by using ANN. As with Yu, the described approach utilizes a training set of data in order to properly configure the ANN or other machine learning approach. For example, in one implementation, a color set of 1950 samples were used.

Thus, what is needed in the art, are systems, methods and products that allow for robust calibration of a color measurement device using a process that is more efficient, accurate, and less time consuming than existing approaches.

SUMMARY

In one non-limiting implementation, in order to calibrate a color measurement device, a collection of calibration functions are generated and utilized. For example, in one implementation of the approach described herein, a plurality of color measurements for each of a plurality of color samples using a plurality of color measurement devices are obtained. Using these values, a processor is configured to calculate a standard color measurement for each of the plurality of color samples that represents the virtual center or average of the color measurements values obtained by the plurality of color measurement devices. The described method also includes obtaining, with a master calibration device, reflectance spectra data for each of the plurality of color samples and calculating a first conversion function F to transform the obtained reflectance spectra data for each of the plurality colors values into the obtained virtual center or average color measurement obtained for each of the plurality of color values measured. The method described further include a step of calculating a second conversion function, G, which when supplied with the virtual center data values as an input provides the reflectance spectra data as if it is obtained using the master calibration device. The calibration process further includes obtaining a second set of calibration standards, where the number of calibration standards is less than the number of calibration standards used to derive or generate F and G. The master calibration device is used to measure the second set of calibration standards and output the measurement results to function F so as to obtain a standard raw data space dataset for the second set of calibration standards. It should be appreciated that the data values in the standard raw data space dataset are still in the same format as the raw data obtained by an uncalibrated device. The standard raw data space is representative of a virtual center of measurement of a collection of measurement devices as further described in commonly owned U.S. Pat. No. 9,200,963, herein incorporated by reference in its entirety. The second set of calibration standards are also measured by an uncalibrated color measurement device to obtain a raw color dataset. The raw color dataset is used along with the standard raw data space dataset to derive a transformation function M, where transformation function M converts the raw color dataset into the standard raw data space dataset. In a particular implementation, the method also includes a step of storing the transformation function M to a data storage device that is local to the uncalibrated device.

In a further implementation, a color sample is measured using a color measurement device, the color measurement data is provided to transformation function M in order to obtain a standard space color measurement of the sample. The standard space color measurement of the sample is provided to function G in order to generate a reflectance spectra dataset that corresponds to a calibrated color measurement of the sample.

In yet a further implementation, a set of calibration colors is measured with both a plurality of similar color measurement devices and a master color measurement instrument. The reflectance spectra data of the calibration colors obtained from the master color measurement instrument will be converted to raw data in the standard raw data space using a pre-determined function for the conversion. The raw data of the calibration colors obtained from the color measurement device and the raw data converted from the master reflectance spectra can determine a function to transform raw data color measurements obtained by a color measurement device into the standard raw data space. Using this transformation function, raw data of any color sample measured by a color measurement device can be converted to raw data in the standard raw data space, and then converted to reflectance data using another pre-determined function. The two pre-determined functions are established by connecting raw data in the standard raw data space and their corresponding master reflectance spectra using matrix transformation or artificial neural network (ANN) or other machine learning methods.

In yet a further implementation of the described approach, a system including a processor and a memory configured to store code executed by the processor is provided. In one or more implementations, the processor is configured by the code to calibrate measurements made by color measurement devices. In one particular implementation, the processor receives a measurement dataset of one or more color values, for a sample obtained by a color measurement device. The processor is configured to convert the measurement dataset to a standard space measurement dataset using a standard space measurement model and calculate a color dataset based on the standard space measurement dataset using a color conversion model. The processor is further configured to output the calculated color dataset to at least one of a display, database or local memory store. As used herein, the term 'model' refers generally to any function, equation, operation, or algorithm that receives, transforms and/or generates values. For example, the standard space measurement model is a model that is configured to receive a collection of data values and transform those data values using one or more mathematical or logical operations.

In a particular implementation, the processor is further configured to derive the standard space measurement model using at least one of a liner transformation matrix, artificial neural network or machine learning algorithm that receives the measurement dataset as an input dataset and outputs a standard space measurement dataset in response thereto.

In a particular implementation, the processor is further configured to derive the color conversion model as a data structure corresponding to at least one of a transformation matrix, artificial neural network or machine learning algorithm that receives the standard space measurement dataset as input values and output color space values in response.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF CERTAIN EMBODIMENTS OF THE INVENTION

Figure 1:
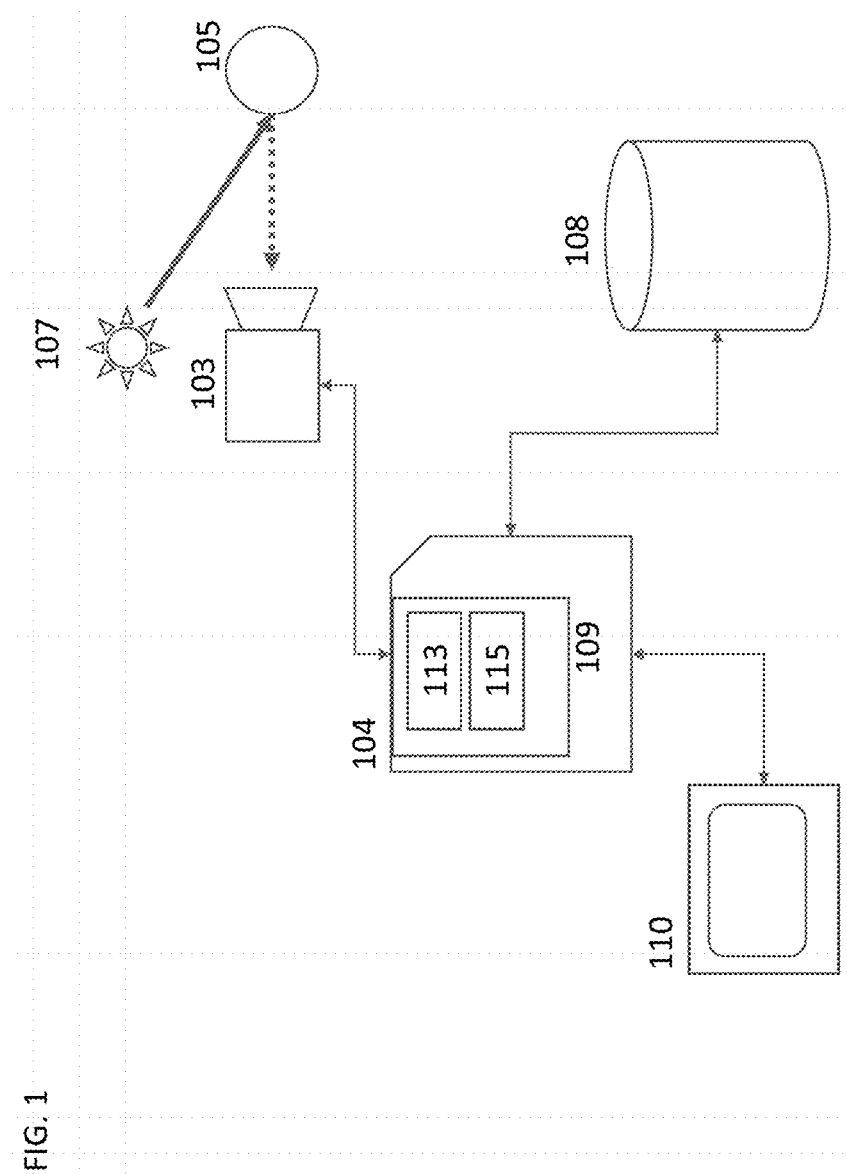
FIG. 1 illustrates devices and components that interface over one or more data communication networks in accordance with one or more implementations of the present application.

By way of overview and introduction, the present disclosure is directed to the generation and application of a multi-step calibration process that results in improved accuracy while minimizing the amount of calibration samples necessary to properly calibrate a color measurement device. More broadly, the described approaches calibrate color measurement devices in a manner that requires less color samples, or device specific calibration steps, relative to prior approaches. For example, the presently described approach is able to calibrate a color measurement device using fewer than 100 colors. In a particular implementation, the number of calibration colors used to calibrate a color measurement device is 66. In a further arrangement, the number of calibration colors used to calibrate a color measurement device is between 66 and 36 colors.

In a particular implementation, device independent portions of the particular calibration approaches described herein can be conducted at a factory or other location such that the amount of time spent locally calibrating an individual color measurement device can be minimized.

In one particular implementation, a collection of similar color measurement devices are used to obtain an average measurement of a collection of color samples. As used herein, similar color measurement devices relate to color measurement devices that have the same measurement geometry and components. For example, where each color measurement device uses the same orientation geometry, such as 45/0, d/8, or other illumination/pickup geometry combination and utilize substantially equivalent components (i.e. color sensors, lighting elements, etc.), such color measurement devices are considered to be similar to one another.

In a particular, non-limiting implementation of the calibration approach described herein, at least two (2) different calibrations stages are used to calibrate a color measurement device. Such an approach significantly reduces the number of color samples necessary to calibrate a color measurement device. For example, prior art calibration processes have used more than 7000 color sets. In contrast, the presently described approaches allow for only a few dozens of color samples to be used to calibrate a color measurement device. For example, 66 or fewer colors are needed to calibrate the color measurement device. In another example, 36 colors are used to calibrate the color measurement device.

In one or more configurations, a collection of color samples are used to obtain color measurements. Color measurements are obtained by evaluating the color samples using a master or control color measurement device. Additionally, color measurements are obtained using a collection of similar color measurement devices. The color measurements made by this collection of similar devices can be averaged. These average, or virtual center, color measurements can be used to derive color transformation functions that convert the average color measurements into the color measurements obtained using the standardized or master measurement device and vice versa.

Additionally, an instrument transformation function, such as a linear transformation matrix, can be derived to convert from a raw color measurement made by a single uncalibrated measurement device of a group of calibration standards to a standard raw data space dataset of measurements of the same set of calibration standards. Here, the number of colors in the calibration set is less than those used to generate the transformation functions. In a particular implementation, the standard raw data space dataset is obtained by measuring the same set of calibration standards using a master color measurement instrument and converting the measurements using one of the transformation functions. By using both this instrument transformation function and one of the color transformation functions, the raw data obtained from a small collection of color samples can be used to calibrate a color measurement device that performs as effectively as one calibrated on more than a thousand color samples.

While the current examples provided herein refer to determining reflectance spectra of a sample, the described approaches are configurable to determine transmissive spectra of a product if such an analysis is desired.

Referring now to the drawings, in which like references numerals refer to like elements, FIG. 1 illustrates devices and components for obtaining color measurement data that interface over one or more data communication networks in accordance with one or more implementations of the present application. As shown, FIG. 1 illustrates a sample 105 under analysis by color measurement device or sensor 103. Here, the color sample 105 can be any type or form of physical article having color properties in need of analysis. For instance, the color sample 105 is a molding piece, fabric sample, a paper sample, or other material sample where the color values of the product are desired or needed. In yet a further implementation, the color sample 105 is an object or item integral to a larger structure or item, such as a dashboard of an automobile, or a section of wall of a structure. For example, the color sample 105 is a section or portion of stucco, carpe, building materials, housing, chassis, packaging, or another item.

In one or more implementations, the color sample 105 is illuminated by one or more illuminants 1107. For example, a color measurement device incorporating the color sensor 103 can also include one or more lighting sources 1107, where such lighting sources are one or more discrete light emitting elements, such as LEDs, OLEDs, fluorescent, halogen, xenon, neon, D65 light, fluorescent lamp, mercury lamp, Metal Halide lamp, HPS lamp, incandescent lamp or other commonly known or understood lighting sources. In one or more implementations, the illuminants 1107 include a lens, filter, screen, enclosure, or other elements (not shown) that are utilized in combination with the illuminants 1107 to direct a beam of illumination to the sample 105. In one or more implementations, the illumination 1107 is positioned relative to the sample 105 and color measurement device 103 so as to provide a 45/0, d/8, or other illumination/pickup geometry combination.

Continuing with FIG. 1, light that is reflected off sample 105 (shown in solid lines) and captured or measured by a color measurement device 103 is evaluated. Here, the color measurement device 103 can be a color sensor or image capture device. For example, the color measurement device 103 is a scientific CMOS (Complementary Metal Oxide Semiconductor), CCD (charge coupled device), colorimeter, spectrometer, spectrophotometer, photodiode array, or other light sensing device and any associated hardware, firmware and software necessary for the operation thereof. In a particular implementation, the color measurement device 103 is spectrophotometer manufactured by Datacolor Inc. of Lawrenceville, N.J.

In a particular implementation, the color measurement device 103 is configured to generate an output signal upon light being incident upon the color measurement device 103 or a light sensing portion thereof. By way of non-limiting example, the color measurement device 103 is configured to output a signal in response to light being incident upon a light sensor or other sensor element integral or associated with the color measurement device 103. For instance, the color measurement device 103 is configured to generate a digital or analog signal that corresponds to the wavelength or wavelengths of light that are incident upon a light sensor integral to the color measurement device 103. In one or more configurations, the color measurement device 103 is configured to output raw count data, spectral information, RGB information, or another form of multi-wavelength data representative of light reflected off the sample 105.

The color measurement device 103, in accordance with one embodiment, is a stand-alone device capable of storing local data corresponding to measurements made of the sample 105 within an integrated or removable memory. In an alternative implementation, the color measurement device 103 is configured to transmit one or more measurements to a storage device 108 or a processing platform, such as processor 104. In configurations calling for remote storage of measurement data, the color measurement device 103 is equipped or configured with network interfaces or protocols usable to communicate over a network, such as the internet.

Alternatively, the color measurement device 103 is connected to one or more computers or processors, such as processor 104, using standard interfaces such as direct serial connections, interface bus, USB, FIREWIRE, Wi-Fi, Bluetooth, and other wired or wireless technologies suitable for the transmission measurement data.

The output signal generated by the color measurement device 103 is transmitted to one or more processor(s) 104 for evaluation as a function of one or more hardware or software modules. As used herein, the term "module" refers, generally, to one or more discrete components that contribute to the effectiveness of the presently described systems, methods and approaches. Modules can include software elements, such as but not limited to, functions, algorithms, classes and the like. In one arrangement, the software modules are stored as software in the memory 109 of the processor 104. Modules, in one arrangement, can also include hardware elements that are substantially configured or made operable to carry out any steps, processes or procedures as described herein. In one implementation, the processor 104 is located within the same device, housing or enclosure as the color measurement device 103. However, in another implementation, the processor 104 is remote or separate from the color measurement device 103.

In one configuration, the processor 104 is configured through one or more software modules to generate, calculate, process, output or otherwise manipulate the output signal generated by the color measurement device 103.

In one implementation, the processor 104 is a commercially available computing device. For example, the processor 104 may be a collection of computers, servers, processors, cloud-based computing elements, micro-computing elements, computer-on-chip(s), home entertainment consoles, media players, set-top boxes, prototyping devices or "hobby" computing elements.

Furthermore, the processor 104 can comprise a single processor, multiple discrete processors, a multi-core processor, or other type of processor(s) known to those of skill in the art, depending on the particular embodiment. In a particular example, the processor 104 executes software code on the hardware of a custom or commercially available cellphone, smartphone, notebook, workstation or desktop computer configured to receive data or measurements captured by the color measurement device 103 either directly, or through a communication linkage.

The processor 104 is configured to execute a commercially available or custom operating system, e.g., MICROSOFT WINDOWS, APPLE OSX, UNIX or Linux based operating system in order to carry out instructions or code.

In one or more implementations, the processor 104 is further configured to access various peripheral devices and network interfaces. For instance, the processor 104 is configured to communicate over the internet with one or more remote servers, computers, peripherals or other hardware using standard or custom communication protocols and settings (e.g., TCP/IP, etc.).

The processor 104 may include one or more memory storage devices 109 (memories). The memory is a persistent or non-persistent storage device (such as an IC memory element) that is operative to store the operating system in addition to one or more software modules. In accordance with one or more embodiments, the memory comprises one or more volatile and non-volatile memories 113, such as Read Only Memory ("ROM"), Random Access Memory ("RAM"), Electrically Erasable Programmable Read-Only Memory ("EEPROM"), Phase Change Memory ("PCM"), Single In-line Memory ("SIMM"), Dual In-line Memory ("DIMM") or other memory types. Such memories can be fixed or removable, as is known to those of ordinary skill in the art, such as through the use of removable media cards or modules. In one or more embodiments, the memory of the processor 104 provides for the storage of application program and data files. One or more memories provide program code 115 that the processor 104 reads and executes upon receipt of a start, or initiation signal.

The computer memories may also comprise secondary computer memory, such as magnetic or optical disk drives or flash memory, that provide long term storage of data in a manner similar to a persistent memory device. In one or more embodiments, the memory of the processor 104 provides for storage of an application program and data files when needed.

The processor 104 is configured to store data either locally in one or more memory devices. Alternatively, the processor 104 is configured to store data, such as measurement data or processing results, in a local or remotely accessible database 108. The physical structure of the database 108 may be embodied as solid-state memory (e.g., ROM), hard disk drive systems, RAID, disk arrays, storage area networks ("SAN"), network attached storage ("NAS") and/or any other suitable system for storing computer data. In addition, the database 108 may comprise caches, including database caches and/or web caches. Programmatically, the database 108 may comprise flat-file data store, a relational database, an object-oriented database, a hybrid relational-object database, a key-value data store such as HADOOP or MONGODB, in addition to other systems for the structure and retrieval of data that are well known to those of skill in the art. The database 108 includes the necessary hardware and software to enable the processor 104 to retrieve and store data within the database 108.

In one implementation, each element provided in FIG. 1 is configured to communicate with one another through one or more direct connections, such as through a common bus. Alternatively, each element is configured to communicate with others through network connections or interfaces, such as a local area network LAN or data cable connection. In an alternative implementation, the color measurement device 103, processor 104, and database 108 are each connected to a network, such as the internet, and are configured to communicate and exchange data using commonly known and understood communication protocols.

In one arrangement, the processor 104 communicates with a display device 110 for displaying data. In one arrangement the display device 110 and processor 104 are incorporated into a single form factor, as in the case of a notebook computer, portable device and the like. In another configuration, the display device is a computer or data processor remote from the processor 104 that enables the user to receive data. The display device 110 further includes one or more associated input devices and/or hardware (not shown) that allow a user to access information, and to send commands and/or instructions to the processor 104 and the color measurement device 103. In one or more implementations, the display device 110 is a screen, monitor, display, LED, LCD or OLED panel, augmented or virtual reality interface or an electronic ink-based display device.

Those possessing an ordinary level of skill in the requisite art will appreciate that additional features, such as power supplies, power sources, power management circuitry, control interfaces, relays, adaptors, and/or other elements used to supply power and interconnect electronic components and control activations are appreciated and understood to be incorporated.

It will be appreciated that the described arrangement of elements can, in one implementation, be used to generate or derive from groups of similar devices one or more calibration factors, that when applied to measurements made by a color measurement device, align the output of such devices with the expected output of a master or control color measurement device.

Figure 2:
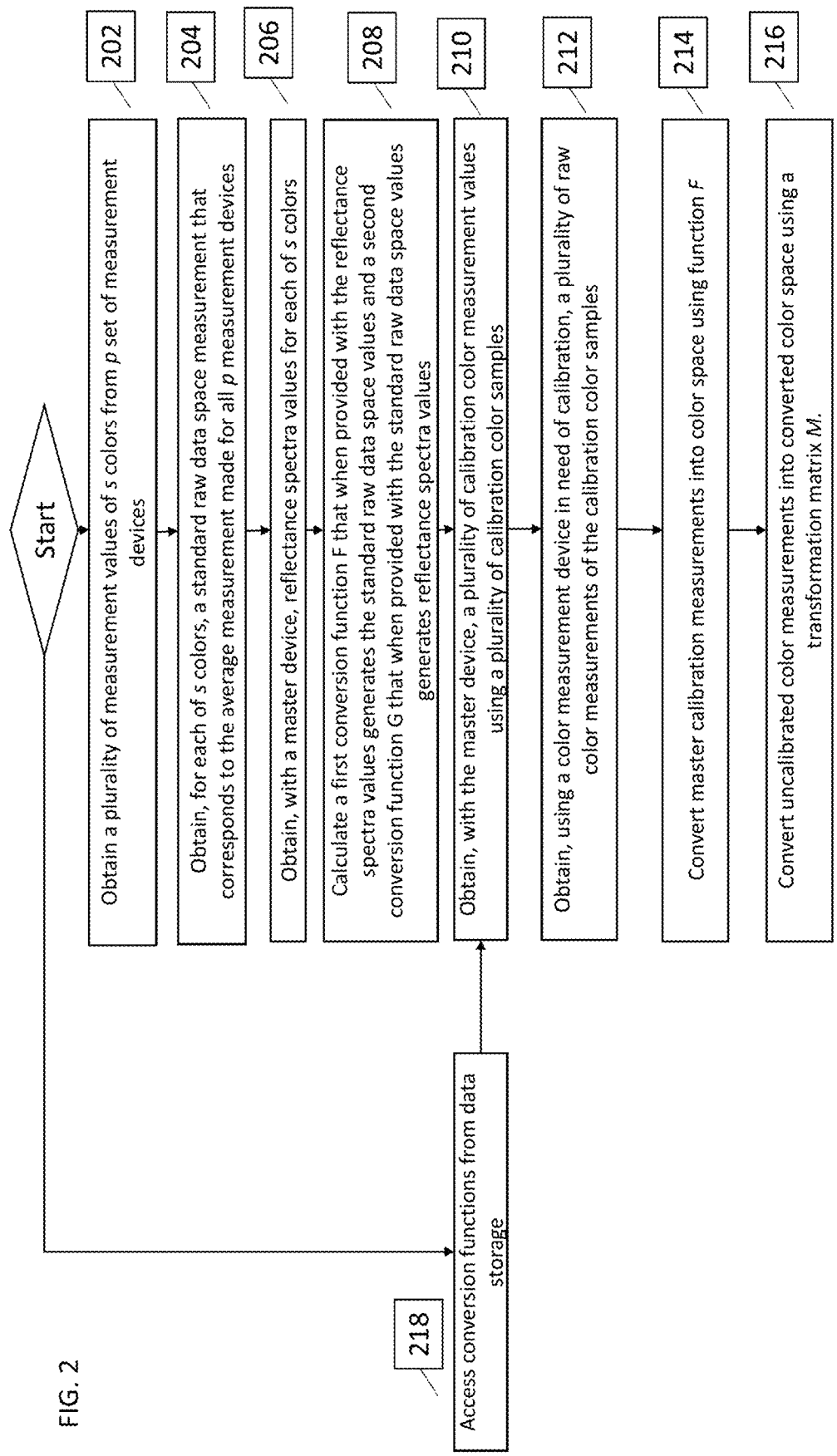
FIG. 2 provides a flow diagram detailing particular steps in the device calibration process according to one or more implementations of the present application.
Figure 3:
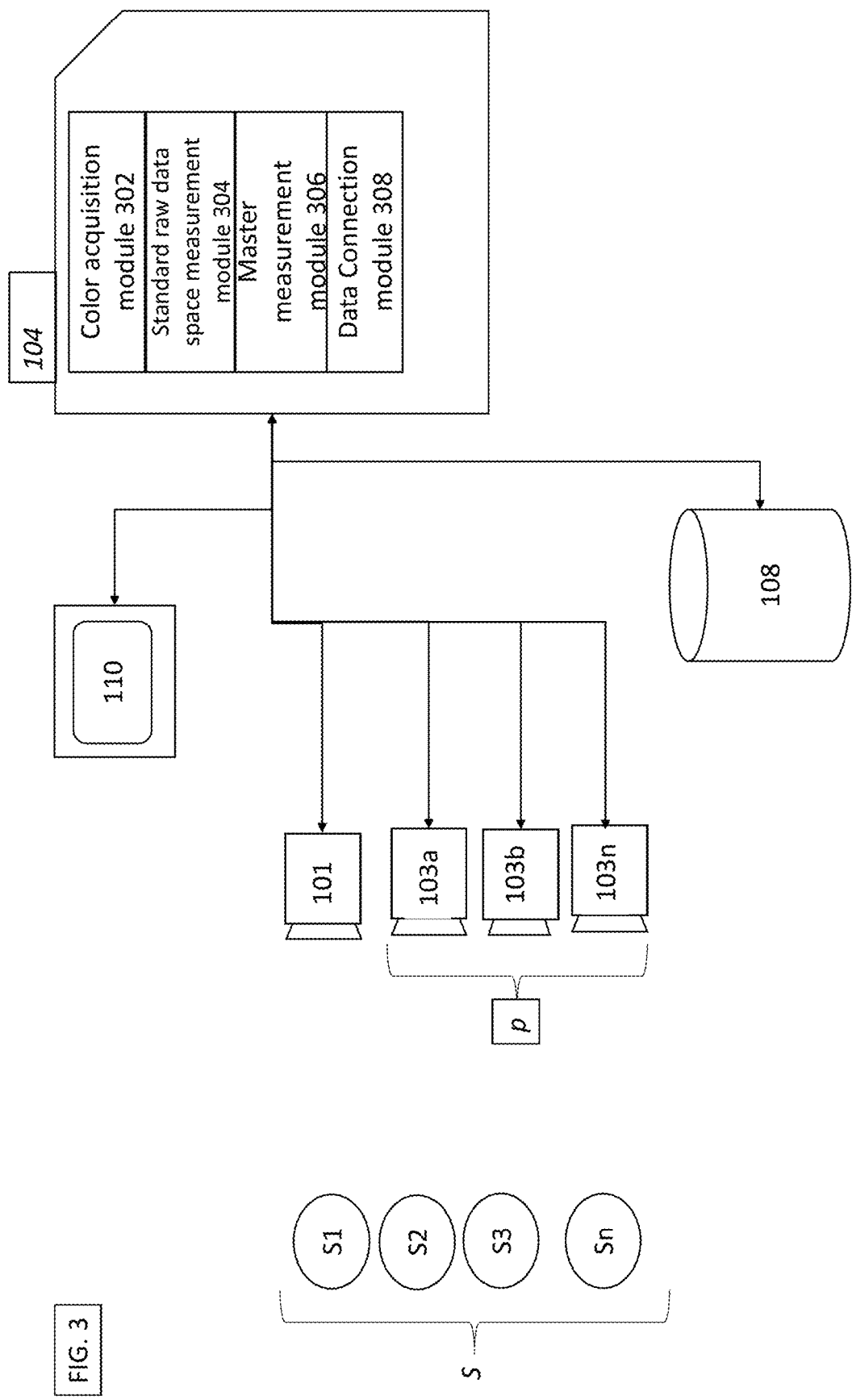
FIG. 3 provides a block diagram of various modules that configure one or more processors in accordance with one or more implementations of the present application.

Turning now to the flow diagram of FIG. 2, and the block diagram of FIG. 3, a multi-step calibration process is described. By way of overview, the described process utilizes a collection of color samples s having known color values as calibration targets. This collection of reference color samples (S1-Sn) is evaluated, as shown in step 202, by a plurality of color measurement devices (103*a*-103*n*). By way of non-limiting explanation, FIG. 3 provides a block diagram detailing the interconnections between the components and elements used in the process detailed by FIG. 2.

As shown in FIG. 3, in one implementation, a group p (where p≥1) of similar color measurement devices (i.e. 103*a*, 103*b* . . . 103*n*) are used to define a standard raw data space. In one or more configurations the processor 104 is configured by a color acquisition module 302 that receives the measurements made by each of the p group of color measurement devices.

By way of detailed explanation, it is assumed that each device has n channels, such that n raw data values are obtained for each measurement obtained by each color measurement device within group p. In one arrangement, the set of reference colors s (for example, 1950 NCS colors) are measured with each of the color measurement devices in group p in order to obtain the raw data (i.e. n raw data values for each device in p) for each color in the color set s.

As shown in step 204, the processor 104 is configured to calculate a standard raw data space for each of the colors in sample color set s. By way of example, the processor 104 is configured with a standard raw data space measurement module 304. The standard raw data space module 304 configures the processor 104 to combine the measurement values obtained in step 202 and determine a standard or virtual center representation of each color. In one implementation, the standard raw data space measurement module 304 calculates the average raw data values obtained for each of the plurality of color samples made by the plurality of color measurement devices. In one or more implementations, such an average can be considered the virtual midpoint of the measurement data set for each color. For instance, the raw data obtained from the total number of devices in the p group can be averaged to get the average raw data of each color measured in color set s. Thus, the processor 104 is configured to obtain s groups of n-number average raw data. For example, if color set s is 1950 colors, then for each of the 1950 colors there will be p×n data values. The average value calculated for each color in the color set s then defines a standard raw data space. By way of explanation, an average of each of the p device measurements for a given color in color set s can be treated as the results of a 'virtual' standard device. This virtual standard device, when used to measure the s colors in the color set, will give the n number of averaged raw data. In one or more particular implementations, the standard raw data space measurement module 304 further configures the processor 104 to store the average raw measurement values in database 108 or another data storage location for future retrieval and processing.

Turning now to step 206, a master color measurement device 101 is used to obtain color measurement values for the same color set s. In one or more configurations, the master color measurement device 101 is a color measurement device similar to color measurement devices 103a-103n 103 but has been calibrated to sufficient fidelity or accuracy. In another configuration, the master color measurement device is a color measurement device having a higher level of accuracy or color measurement fidelity compared to the color measurement devices 103a-103n. For example, the color measurement device to be calibrated has, in one arrangement, 8 or 16 color channels. As used herein, a master color measurement device has a greater number of color measurement channels. For example, a master device can have 31 color channels. By way of non-limiting example, the processor 104 is configured by a master measurement module 306 to store the measurements of the s set of colors by the master or control measurement device 101. In one or more implementations the master measurement module 306 includes one or more submodules that configure the processor 104 to store the measurements made using the master or control instrument 101 in a remote or local database 108. In a further implementation, the master measurement module 306 is configured to label or tag measurements made by the master measurement instrument 101 for further access or utilization.

Turning now to step 208, the processor 104 is configured to evaluate the data collected in step 306 with the data values obtained in step 304. For instance, using a data connection module 308, the processor 104 is configured to build a connection between the average raw data (i.e. virtual midpoint) for each color in set s and the master color measurements obtained of the same color set s by the master color measurement instrument 101. In one particular implementation, the processor 104 is configured by one or more modules of the data connection module 306 to derive a function, method, procedure or matrix that allows for the conversion of the measurement data obtained in step 304 into the measurement values obtained in step 306. For instance, the average raw data obtained in step 304 can be described as $raw_0$. In one or more configurations, $raw_0$ is the standard space raw data (s×n matrix) of the s colors. The processor 104 is further configured to access and evaluate the measurement values obtained by the master measurement device, referred to herein as reflM. Using the reflM data as the end state, the processor is able to generate, construct, derive, or otherwise provide a function or data construct, that when applied to $raw_0$ generates the reflM value such that the relationship between the two data sets can be described according to the following:

$$reflM \leftarrow G(raw_0) \quad (1)$$

Likewise, the processor 104 is configured by one or more submodules of the data connection module 308 to derive a complementary function or data structure to the relationship in Equ. 1 such that $$raw_0 \leftarrow F(reflM) \quad (2)$$

It should be appreciated that the functions F( ) and G( ) can be derived by the processor 104 using one or more processes or procedures. For example, the functions F and G can be obtained by the processor 104 performing one or more matrix transformations on reflM or $raw_0$ data values. In an alternative configuration, the processor 104 is configured to derive the $raw_0$ or reflM values using an ANN. For instance, the processor 104 is configured to set the input of an ANN as reflM and the output nodes $raw_0$, or vice versa. In a further implementation, the data connection module 308 includes one or more submodules that derives $raw_0$ and reflM using one or more machine learning methods. By way of particular example, the processor 104 is configured by one or more submodules of the data connection module 308 to calculate a first conversion function F to transform the obtained reflectance spectra data (reflM) for each of the plurality colors values for a given color set s, into the average raw data obtained from the plurality of color measurement devices ($raw_0$) of the same color set. The functions F and G can, in one arrangement, be stored in the database 108 or a local storage device for retrieval or use.

After functions F( ) and G( ) are obtained in step 208, the derived functions can be used to calibrate a color measurement device that is similar to the color measurement devices that were used to obtain the value for $raw_0$. For example, as shown in step 210 and FIG. 4, a set of q colors (where q is smaller than s can be used to calibrate any color measurement device similar to those in the group of devices used in step 202.

Figure 4:
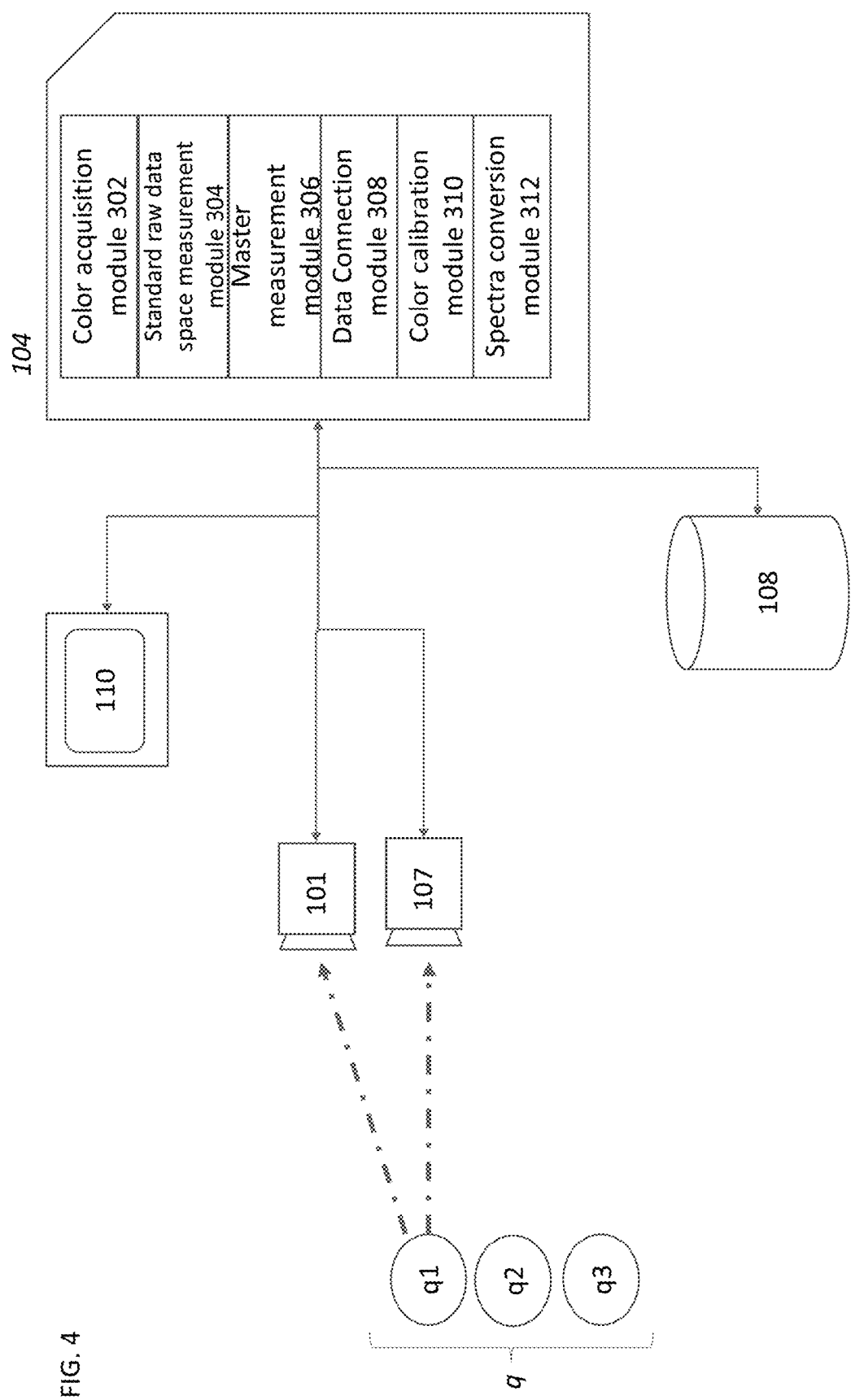
FIG. 4 flow diagram detailing particular steps in the calibration process according to one or more implementations of the present application.

The data obtained from steps 202-208 can be used to calibrate an uncalibrated color measurement device 107, or a color measurement device in need of re-calibration. As shown in FIGS. 2 and 4, the calibration process of an uncalibrated color measurement device 107 can be implemented as a continuation of the process that begins with step 202. In an alternative arrangement, the calibration process includes accessing, using the processor 104, the F and G functions from a memory storage such as database 108, as shown in step 218. Irrespective of the source of the conversion functions F and G, the described process proceeds to step 210.

As shown in FIG. 4, a master instrument 101 is used to measure the set of q colors to obtain reflectance spectra data. For example, the master measurement module 306 further configures the processor 104 to access reflectance spectra data measurements made by the master instrument 101 as shown in step 210 of FIG. 2. Here, in one arrangement, the measurements made by the master measurement device 101 can be referred to as $reflM_q$.

Likewise, in step 212 of FIG. 2, a color measurement device that is in need of calibration (measurement device 107) is also used to measure the same set of q colors that were measured in step 210. In one particular implementation, the processor 104 is configured by the color acquisition module 302 to access and store data that is generated by uncalibrated color measurement device 107. In one or more configurations, the measurements made by the uncalibrated color measurement device are referred to as raw data $raw_{1q}$.

As shown in step 214, the measurements made using the master device 101 in step 210 can be convened into a virtual center (standard raw data space) dataset using the previously accessed or derived function F. By way of non-limiting example, the master measurement module 306 configures the processor 104 to obtain a dataset of measurements of q colors using the master color measurement device 101 such that:

$$raw_{0q} = F(reflM_q) \quad (3)$$

Where $reflM_q$ is the measurements made using the master measurement device 101 and $raw_{0q}$ is the converted standard raw data space of the same set of measurements. Specifically, $raw_{0q}$ represents the measurements obtained for the color set q using a "virtual" center measurement device obtained accordine to step 304.

Turning now to step 216, the processor 104 is configured by one or more submodules of the data connection module 308 to convert the measurements obtained by the uncalibrated measurement device 107 into the converted color space, where the converted color space data is obtained by converting the mater measurement instrument values using function F. In one particular implementation, the raw measurement data obtained by the uncalibrated color measurement device 107 ($raw_{1q}$) are transformed into the standard raw data space ($raw_{0q}$) obtained by transforming the master color measurements as provided in Equ. 3.

For example, the raw measurement data $raw_{1q}$ and the raw data in the standard raw data space ($raw_{0q}$) can be linked to one another according to the following:

$$raw_{0q} \leftarrow M(raw_{1q}). \tag{4}$$

It will be appreciated that function M can be derived in a number of different ways. For example, M can be a linear transformation matrix such that:

$$M = pinv(raw_{1q}) * raw_{0q} \tag{5}$$

Although a transformation matrix M is used as an example, it will be appreciated that other methods can be used to convert the measured raw data into the standard space data. For instance, an ANN can be used to convert device raw data, to the standard space raw data. In this configuration, the raw data is provided as an input to an ANN and the standard space conversion is the output data.

After M is determined, the uncalibrated measurement device 107 is now calibrated and the processor 104 can access data storage modules to store M for use in routine color measurement workflows. In one arrangement, is stored locally to the specific color measurement device. In an alternative arrangement, M is stored in a remotely accessible database (such as database 108) and is accessed when measurements by a local color measurement device are made. Once M has been determined, the uncalibrated color measurement device is calibrated and can be used to measure color samples.

Figure 5:
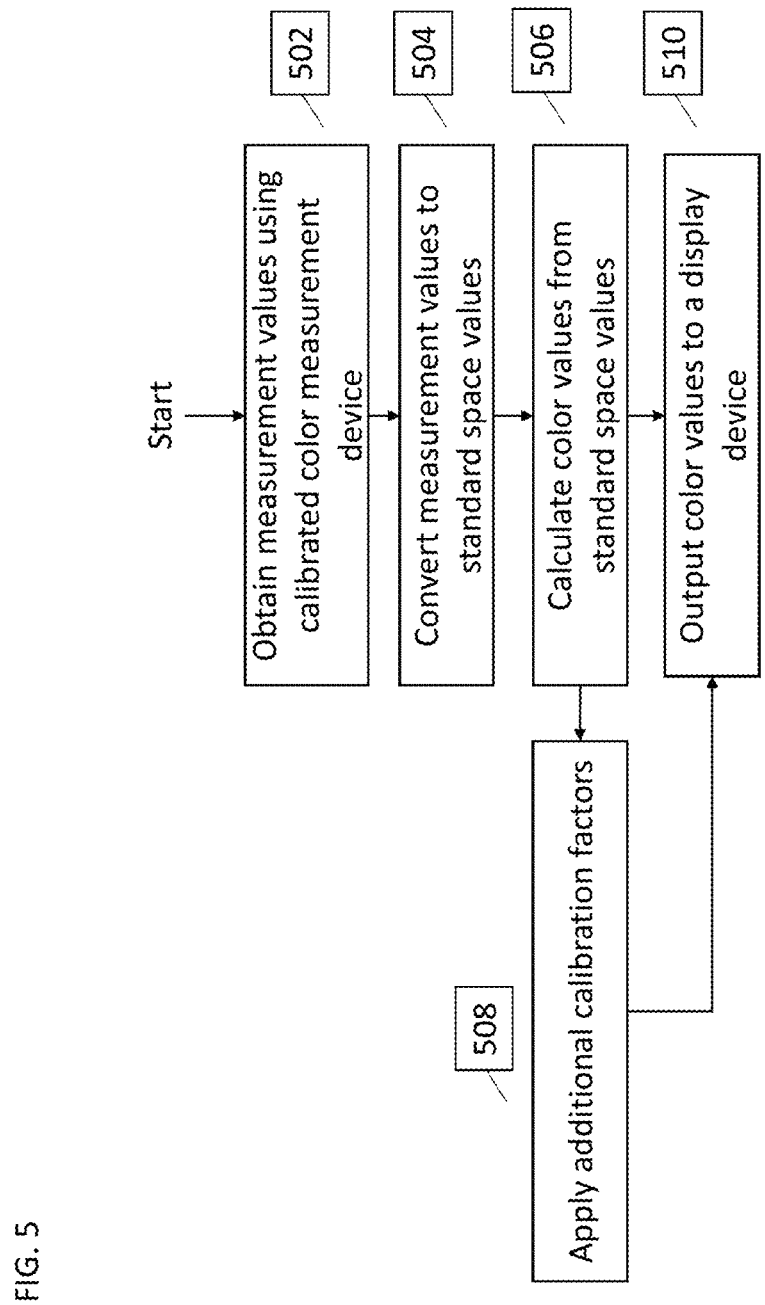
FIG. 5 flow diagram detailing particular steps in the color calibration process according to one or more implementations of the present application.

Turning now to FIG. 5, a process of measuring colors using the calibrated color measurement device is provided. As shown in the flow diagram, the color measurement process begins when the calibrated color measurement device is used to measure a color, as in step 502. In one or more configurations, a processor 104, local or remote to the calibrated color measurement device is used to measure color of a sample or material under analysis and store the output of the direct color measurement as $raw_{1x}$.

In step 504, the processor 104 (local or remote to the color measurement device) accesses the function M, either from local storage or from the database 108. In one or more implementations, a color calibration module 310 configures the processor 104 to evaluate the raw data using the transformation function M. For instance, where the transformation function M is a matrix, the acquired measurement data ($raw_{1x}$) can be evaluated according to the following:

$$raw_{0x} = raw_{1x} * M \tag{6}$$

where M is a matrix obtained according to Eq. 5 and $raw_{0x}$ represents the raw measurement data obtained in step 502 converted into a "virtual" middle or virtual average of the raw data in the standard raw data space.

As shown in step 506 of FIG. 5, the processor 104 is configured by a spectra conversion module 312 that configures the processor 104 to convert the standard raw space data into standard color values. For example, the processor 104 is configured by one or more modules to convert the values $raw_{0x}$ obtained in step 504 into color values according to $$refl_x \leftarrow G(raw_{0x}). \tag{7}$$

Where $refl_x$ represents the conversion of the standard raw data space, which in turn, were a conversion of the raw measurement values obtained by the calibrated color measurement device. Here, the function G is accessed from a remote storage device, such as database 108 or another data storage location. Using function G, the processor 104 is configured by the spectral conversion module 312 to obtain data that corresponds to the measurements obtained by the color sample measured as though the color were measured using the master or control instrument 101.

Figure 7:
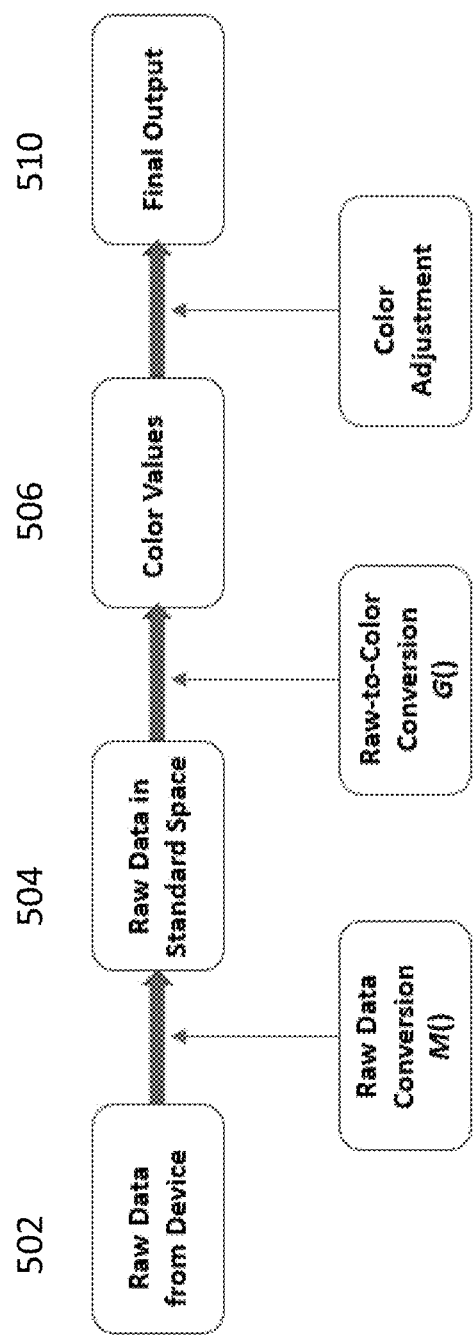
FIG. 7 flow diagram detailing particular steps in the color calibration process according to one or more implementations of the present application.

In one or more further arrangements, the processor 104 is configured, as shown in step 506, to apply additional calibration factors to the derived $refl_x$ value. For example, as shown in FIG. 7, the color values obtained in step 506 can either be directly used as final output, or be further adjusted as in step 508, in order to compensate for various sample specific criteria or properties. In one or more implementations, a user is able to provide an input to the processor 104. In one arrangement the input is a value, or data set that corresponds to a surface condition (gloss, texture, etc.) of a sample under analysis. In another configuration, the processor 104 is configured to use the derived values in step 506 to generate corresponding values in a different color space than the one used in step 504. In turn, these converted or compensated values can then be provided as the final output as shown in step 510.

In one or more implementations, the final output is provided in one or more visual indicators, text strings, graphics, or other display elements on display device 110.

It should be appreciated that when the raw data are collected from the calibrated device, as in step 502, the conversion matrix M is applied to convert this device-specific raw data to the raw data in the standard raw data space. The matrix M is device specific, and it can be calibrated during production using a limited number of colors, as described in equation (5). After the device-specific raw data are converted to standard space raw data, a predetermined conversion function G( ) is applied to the standard raw data, and convert the raw data into color values. Since the function G( ) is not device specific, a pre-existing function can be directly used.

Figure 6:
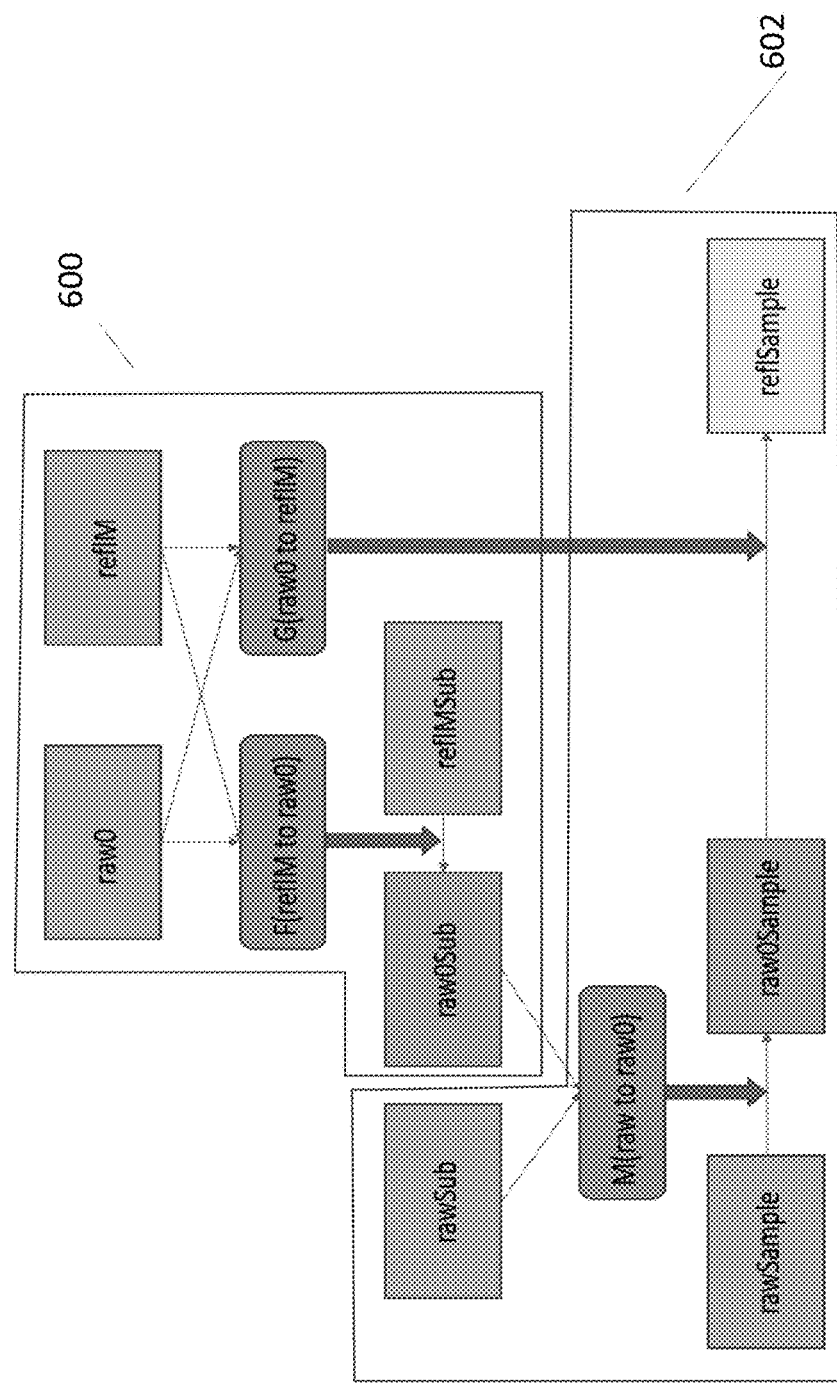
FIG. 6 flow diagram detailing particular steps in the color calibration process according to one or more implementations of the present application.

As shown in FIG. 6, the whole process of development or derivation of the functions G and F can be clone remote from the color measurement device (i.e. 107). For example, the processor 104 used to derive functions G and F can be a remote processor, such as a cloud based processing or computing system 600. Likewise, a measurement device 602 is configured to receive $raw_{0q}$ and function G from the cloud service. Here, the measurement device 602 is configured to derive M using $raw_{0q}$ and local calibration data. It will be appreciated that although obtaining M requires device-specific data $raw_{1q}$, M can be saved either locally or remotely. For example, in circumstances where the calibration process (obtaining M) is done in at a production facility (i.e. a factory) the color measurement process (obtaining $raw_{0x}$ and outputting $refl_x$) can be accomplished by the color measurement device locally at a measurement site.

In an alternative configuration all of the steps illustrated in FIG. 2 can be done on a local color measurement device (with the exception of the device measurements needed to derive function G and F). In an alternative configuration, depending on the particular needs of the user, the calibration process can be carried out in multiple locations, including partly or wholly carried out in a cloud computing environment. By way of non-limiting example, the raw data from the device with other device-specific information such as device id are uploaded into the cloud, and the raw data is processed in the cloud and the final output is sent back to the device.

It will be appreciated that since the raw-to-color conversion function G( ) is independent of each individual color measurement device, the function G( ) can be updated if needed. For instance, a manufacturer can update the G( ) function over time with additional data. This updated function G( ) can then be accessed at any time by the color measurement device and applied to achieve improved performance. Furthermore, the function G( ) can also be tailored to a specific application or a specific device to achieve better performance. For example, a first device (D1) might usually be used to measure a specific sample type. In this configuration a distinct function G1( ) is specifically trained for the particular sample type and is used to process measurements when relevant sample type is measured by the color measurement device. For example, a distinct function G1( ) that corresponds to paint samples can be used to process raw data from a color measurement device that is used to measure paint samples. Continuing with the present example, where a second device (D2) is used to measure a different sample type (i.e. textile samples) a different function G2( ) is derived or generated using textile samples. In the event that D2 is repurposed to measure paint samples, the first function G1( ) can be accessed and used to evaluate the raw data.

While this specification contains many specific embodiment details, these should not be construed as limitations on the scope of any embodiment or of what can be claimed, but rather as descriptions of features that can be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and even initially claimed as such, one or more features from a claimed combination can in some cases be excised from the combination, and the claimed combination can be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain embodiments, multitasking and parallel processing can be advantageous.

Publications and references to known registered marks representing various systems cited throughout this application are incorporated by reference herein. Citation of any above publications or documents is not intended as an admission that any of the foregoing is pertinent prior art, nor does it constitute any admission as to the contents or date of these publications or documents. All references cited herein are incorporated by reference to the same extent as if each individual publication and references were specifically and individually indicated to be incorporated by reference.

While the invention has been particularly shown and described with reference to a preferred embodiment thereof, it will be understood by those skilled in the art that various changes in form and details may be made therein without departing from the spirit and scope of the invention. As such, the invention is not defined by the discussion that appears above, but rather is defined by the claims that follow, the respective features recited in those claims, and by equivalents of such features.

What is claimed is:

1. A method of calibrating a color measurement value, the method comprising:
    obtaining a first color measurement set of a plurality of training color samples using a plurality of color measurement devices;
    calculating a standard raw data space dataset for each color of the first color measurement set, where the standard raw data space dataset represents the average raw measurement values obtained for each of the plurality of training color samples made by the plurality of color measurement devices;
    obtaining, with a master color measurement device, reflectance spectra data for each of the plurality of training color samples;
    calculating a first conversion function F, using a suitably configured processor, where the first conversion function F is configured to transform the obtained reflectance spectra into the standard raw data space dataset;

obtaining, using the master calibration device, a plurality of reflectance spectra values of a plurality of color calibration samples, wherein a number of color calibration samples is less than a number of plurality of training color samples;

converting, using function F, the plurality of reflectance spectra values of a plurality of color calibration samples into a standard space calibration measurement set;

obtaining, with an uncalibrated color measurement device having a substantially similar number of measurement channels as a number of measurement channels of plurality of the color measurement devices, a plurality of raw color measurements of the plurality of calibration color samples;

deriving a transformation function M, where transformation function M transforms the plurality of raw color measurements into the standard space calibration measurement set; and providing the transformation function M to a data storage device that is local to the uncalibrated color measurement device or remotely accessible to the uncalibrated color measurement device.

2. The method of claim 1, wherein the transformation function M is a linear transformation matrix:

$$M = pinv(\text{raw}_{1q}) * \text{raw}_{0q}$$

Where $\text{raw}_{1q}$ is raw color measurements and $\text{raw}_{0q}$ is the standard space calibration measurement.

3. The method of claim 1, where the transformation function M is derived using a matrix transformation, artificial neural network or machine learning algorithm.

4. The method of claim 1 further comprising:
obtaining, using the uncalibrated color measurement device, a sample measurement dataset of a sample under analysis;

converting the sample measurement dataset to a sample standard space measurement dataset using M; and calculating a second conversion function a using a suitably configured processor where the second conversion function G is configured to transform the standard raw data space dataset into the obtained reflectance spectra;

calculating a reflectance spectra dataset by providing the sample standard space measurement dataset to conversion function G.

5. The method of claim 4 where converting the sample measurement dataset using M is accomplished according to:

$$\text{raw}_{0x} = \text{raw}_{1x} * M$$

where, the data of the $\text{raw}_{1x}$ is the sample measurement dataset, and $\text{raw}_{0x}$ is the obtained sample standard space measurement.

6. The method of claim 4, further comprising:
adjusting a reflectance spectra dataset based on a sample parameter.

7. The method of claim 6, further comprising:
wherein the sample parameter is at least one of gloss or texture or other surface properties.

8. The method of claim 4, further comprising:
converting the reflectance spectra dataset to a different color space.

9. The method of claim 4, further comprising:
outputting the adjusted color dataset to at least one of a local memory device, a display device, or a network storage device.

10. The method of claim 1, wherein each of the reference color measurement devices have the same measurement geometry.

11. The method of claim 1, wherein there are no more than 36 colors in the color measurement set of a plurality of training colors.

* * * * *